United States Patent [19]

Felzer

[11] 3,827,525

[45] Aug. 6, 1974

[54] ENERGY ABSORBING CONSTRUCTION FOR FRONT-ENGINED MOTOR VEHICLES

[75] Inventor: Bertold Felzer, Russelsheim/Main, Germany

[73] Assignee: General Motors Corporation, Detroit, Mich.

[22] Filed: Apr. 26, 1973

[21] Appl. No.: 354,703

[30] Foreign Application Priority Data
May 24, 1972 Germany............................ 2225089

[52] U.S. Cl. .......................... 180/82 R, 296/28 R
[51] Int. Cl. ............................................ B60r 21/00
[58] Field of Search ....... 180/82 R, 64 R; 296/28 R, 296/35 B; 280/106 R

[56] References Cited
UNITED STATES PATENTS

| | | | |
|---|---|---|---|
| 3,525,413 | 8/1970 | Kripke | 180/82 R |
| 3,578,782 | 5/1971 | Miyoshi | 180/82 R |
| 3,589,466 | 6/1971 | Dudley | 180/82 R |
| 3,638,748 | 2/1972 | Tixier | 180/64 R |
| 3,743,347 | 7/1973 | Shaw | 296/35 R |
| 3,774,712 | 11/1973 | Froumajou | 180/82 R |

*Primary Examiner*—David Schonberg
*Assistant Examiner*—Terrance L. Siemens
*Attorney, Agent, or Firm*—Ronald L. Phillips

[57] ABSTRACT

A front-engined motor vehicle has two convergent slide rails extending from the engine compartment into a large-mouthed transmission tunnel extending into the vehicle passenger compartment and diminishing in cross-section rearwardly of the mouth. The convergent slide rails and the transmission tunnel resist in an energy-absorbing manner rearward movement of the engine consequent upon a frontal impact on the vehicle.

5 Claims, 5 Drawing Figures

PATENTED AUG 6 1974

ENERGY ABSORBING CONSTRUCTION FOR FRONT-ENGINED MOTOR VEHICLES

This invention relates to front-engined motor vehicles, in each of which the engine can, in the event of a frontal impact of a predetermined magnitude on the vehicle, move on slide rails towards a passenger compartment of the vehicle.

In the event of a frontal collision the front part of the vehicle should deform in an energy-absorbing manner, whereas the passenger compartment should be resistant to collapse. Generally speaking, the greater the amount of energy to be absorbed the greater will need to be the deformation length of the front part of the vehicle. This is on the assumption that the highest admissible deceleration of the vehicle is not exceeded. However, increasing the deformation length of the front part of the vehicle results in an inordinate increase in length of that part.

It is an object of the invention to provide a front-engined vehicle in which in the event of an impact on the vehicle, the engine is restrained from movement transversely of the vehicle, which movement could involve the risk of the engine entering the passenger compartment of the vehicle in the region of the passengers' feet, yet is permitted to move rearwardly of the vehicle in an energy-absorbing manner.

The appended claims define the scope of the monopoly claimed. How the invention can be performed is hereinafter particularly described with reference to the accompanying drawings, in which:

Figure 1:
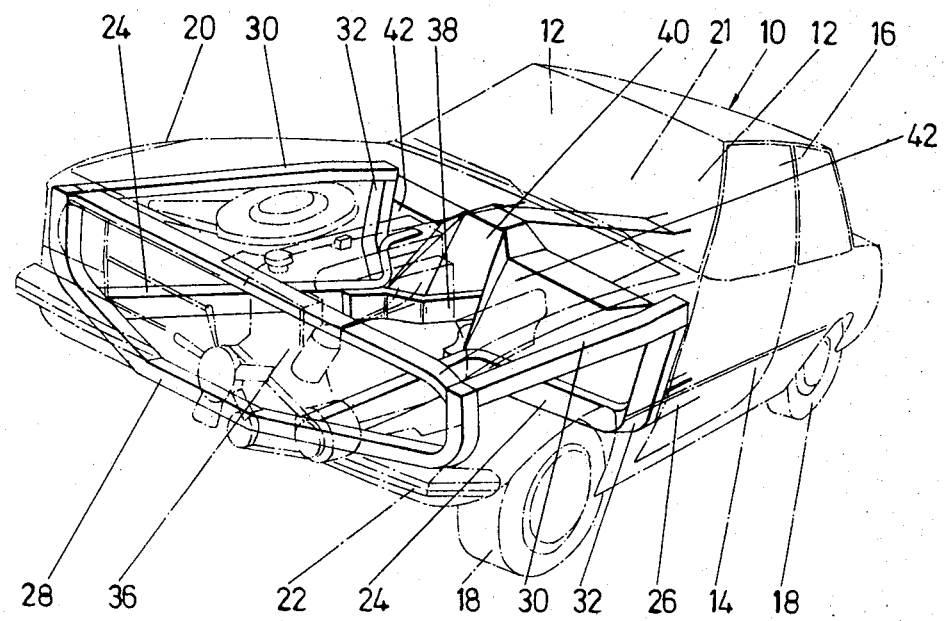
FIG. 1 is a perspective schematic representation of a motor vehicle according to the invention with the front part of the vehicle exposed to show the engine and details of the body members.
Figure 3:
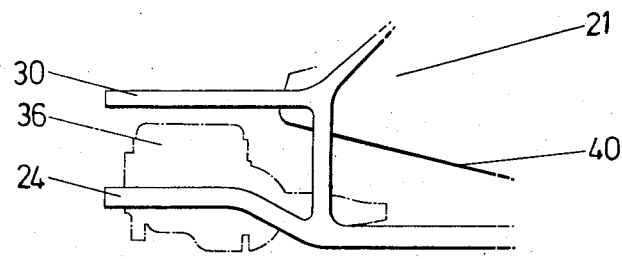
Figure 4:
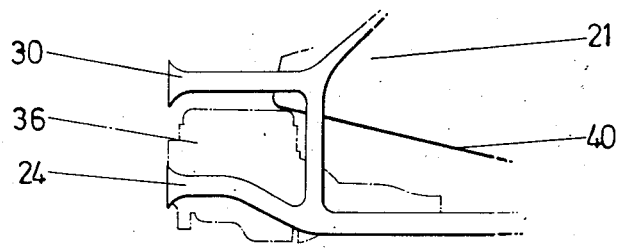
Figure 5:
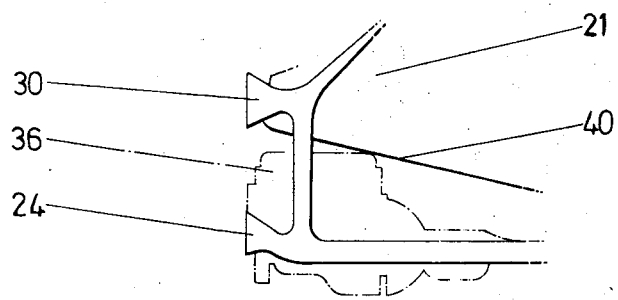

FIG. 3 is a schematic side view of part of the front part of the motor vehicle of FIG. 1 showing the engine before frontal impact on the vehicle; and FIGS. 4 and 5 are schematic views similar to FIG. 3 but showing an intermediate and final stage respectively in the movement of the engine and the deformation of the front part of the motor vehicle as the result of a frontal impact on the motor vehicle.

Figure 2:
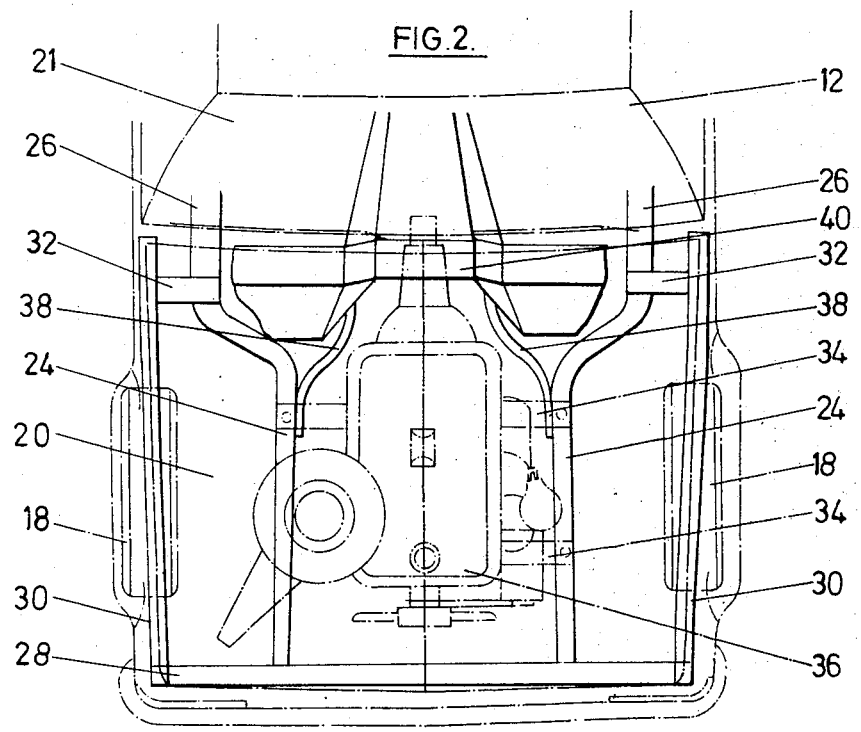
FIG. 2 is a plan view of the front part of the motor vehicle of FIG. 1.

In FIG. 1, reference numeral 10 indicates a motor vehicle shown generally in dash-dot lines. 12 designates a windscreen of the vehicle, 14 a door having a window 16, and 18 indicates the road wheels, two only of which are visible in FIGS. 1 and 2. A passenger compartment, resistant to collapse in the event of an impact on the vehicle, is designated generally by 21, and from this passenger compartment there extends forwardly of the vehicle an engine compartment 20, forming the front part of the vehicle. A bumper 22 is shown as being secured to the front of the engine compartment 20.

Two rail-like side members 26 extend the length of the vehicle, one on each side of the passenger compartment, 21, at about floor level and at their respective forward end each side member has a portion 24 extending forwardly into and through the length of the engine compartment 20. The portions 24 are bent so as to lie closer to one another than do the rest of the side members 26. A frame-like support 28 of generally rectangular configuration extends transversely across the front of the engine compartment 20 and this support 28 is secured to the forward ends of the side rail portions 24.

If desired, the frame-like portion 28 could constitute a front bumper structure for the vehicle. Two side rails 30 extend back one on each side of the engine compartment, from respective upper end portions of the frame-like support 28. These side rails 30 run generally parallel to the side member portions 24 and the side members 26 but lie upwardly of them as seen in side elevation in FIGS. 1, 3 and 4. At its rearmost end, adjacent a firewall or bulkhead 42 between the engine compartment and the passenger compartment, each side rail 30 has a downwardly extending portion 32 which connects the side rail to the respective side member 26.

A vehicle propulsion engine 36, indicated generally in FIGS. 1 and 2 by dash-dot lines, is located in the engine compartment 20. The engine 36 is drivingly connected to the rear wheels 18 by conventional transmission and drive line units, not shown, and not described since they form no part of the present invention. The engine is mounted on the side member portions 24 by means of cantilever brackets indicated schematically by reference numeral 34 in FIG. 2, and incorporating in known manner rubber or like elastomeric elements such that in the event of an impact of predetermined magnitude on the vehicle the engine can break away from its mountings.

Two slide rails 38 are secured respectively at their forward ends one to each side member portion 24 and these slide rails extend rearwardly of the engine compartment 20 and into a transmission tunnel 40 which extends from the engine compartment into the passenger compartment. The firewall 42 extends on either side of the forward end or mouth of the transmission tunnel. The slide rails 38 extend obliquely downwards from the side member portions. FIGS. 1 and 3 show that the engine is mounted so that the side member portions 24 and the forward ends of the slide rails 38 lie within the height range of the engine that is they lie between the top and bottom of the engine when viewed in side elevation.

The forward end or mouth of the transmission tunnel 40 is so dimensioned that its cross-sectional area is greater than the cross-sectional area of the engine 36 so that when the engine 36 breaks away from its mountings, as the result of a frontal impact of predetermined magnitude on the vehicle, and moves rearwardly of the engine compartment 20, it can freely enter the mouth of the transmission tunnel 40. The engine slides along the slide rails 38 as it moves rearwardly, as the result of such an impact and is freely supported by the slide rails 38. The transmission tunnel 40 as seen in FIGS. 1 and 2 diminishes in cross-sectional area rearwardly from its mouth. As the engine 36 moves into the transmission tunnel 40, in consequence of such an impact mentioned above, so it engages the sides of the transmission tunnel which resist further movement of the engine into the tunnel. The deformation of the transmission tunnel which results from this resistance to movement of the engine absorbs energy and so slows down and stops rearward movement of the engine 36. The slide rails 38 are more widely spaced apart at their forward ends than at their rear portions which extend into the transmission tunnel 40. As best seen in plan in FIG. 2 each slide rail has a double-curved or generally S formation which results in the rear portions of the slide rails being closer to one another than are the front or forward ends of the slide rails. This narrowing of the spacing between the slide rails is continued into the transmission tunnel 40. As a result of this narrowing the slide rails 38 also resist rearward movement of the engine in an energy-absorbing manner. Additionally, the slide rails 38 guide and control rearward movement of the engine resulting from a frontal impact on the vehicle and restrain the engine from movement transversely of the vehicle with the risk that it could penetrate into the passenger compartment 20 in the region of the passengers' feet at either side of the transmission tunnel 40, yet permits the engine to move rearwardly into the transmission tunnel in an energy-absorbing manner.

FIGS. 3 to 5 show schematically how the engine 36 can move into the transmission tunnel 40 as the result of a frontal impact on the vehicle. FIG. 3 shows the engine 36 mounted relative to the transmission tunnel 40 before impact. FIG. 4 shows the engine entering the mouth of the transmission tunnel 40. Already the side member portions 24 and the side rails 30 have been deformed by the energy of impact. FIG. 5 shows the engine 36 wholly within the transmission tunnel 40 and at rest. The side member portions 24 and the side rails 30 have been further deformed and compressed against the deformation resistant passenger compartment 21. The transmission tunnel 40 has been deformed by the engine 36 yet still retains the engine, and the engine has been prevented from entering the passenger compartment in an uncontrolled manner. The deformation of the portions 24, the rails 30, the slide rails 38 and the transmission tunnel 40 has resulted in absorption of the energy of impact and restraint of the rearward movement of the engine resulting from that impact. Displacement of the engine 36 would result also in deformation or displacement of the propeller shaft, the differential and the drive mechanism connected between the differential and the driven rear wheels of the vehicle.

We claim:

1. A motor vehicle having a passenger compartment resistant to collapse in the event of an impact on the vehicle; an engine compartment extending forwardly from the passenger compartment and containing a vehicle-propulsion engine; a transmission tunnel extending from the engine compartment into the passenger compartment and having a forward mouth with a cross-sectional area greater than the cross-sectional area of said engine; two spaced-apart and rearwardly convergent slide rails mounted, at their forward ends, in the engine compartment and located within the height range of said engine and extending into the transmission tunnel; the arrangement being such that, in the event of a frontal impact on the vehicle engine compartment, sliding movement of the engine relative to said slide rails towards the transmission tunnel is resisted by said slide rails in an energy-absorbing manner.

2. A motor vehicle having a passenger compartment resistant to collapse in the event of an impact on the vehicle; an engine compartment extending forwardly from the passenger compartment and containing a vehicle-propulsion engine; a transmission tunnel extending from the engine compartment into the passenger compartment and having a forward mouth with a cross-sectional area greater than the cross-sectional area of said engine, said transmission tunnel diminishing in cross-sectional area from said mouth rearwardly into said passenger compartment; two spaced-apart and rearwardly convergent slide rails mounted, at their forward ends, in the engine compartment and located within the height range of said engine and extending into the transmission tunnel; the arrangement being such that, in the event of a frontal impact on the vehicle engine compartment, sliding movement of the engine relative to said slide rails into said transmission tunnel is resisted, in an energy-absorbing manner, by the convergence of said slide rails and the convergence of said transmission tunnel resulting from said diminishing cross-sectional area of said transmission tunnel.

3. A motor vehicle having a passenger compartment resistant to collapse in the event of an impact on the vehicle; an engine compartment extending forwardly from the passenger compartment and containing a vehicle-propulsion engine; two spaced apart longitudinally extending side members secured on opposite sides of said passenger compartment and having portions extending forwardly into said engine compartment; said engine being mounted on said side member portions; a transmission tunnel extending from the engine compartment into the passenger compartment and having a forward mouth with a cross-sectional area greater than the cross-sectional area of said engine; two spaced-apart and rearwardly convergent slide rails mounted, at their forward ends on respective ones of said side member portions and located within the height range of said engine and extending into the transmission tunnel; the arrangement being such that, in the event of a frontal impact on the vehicle engine compartment, with consequent breaking away of the engine from said side member portions and sliding movement of said engine along said slide rails and into said transmission tunnel said sliding movement is resisted, in an energy-absorbing manner, by the convergence of said slide rails and the convergence of said transmission tunnel resulting from said diminishing cross-sectional area of said transmission tunnel.

4. A motor vehicle according to claim 3, wherein each of said slide rails, as viewed in plan, has a double-curved formation.

5. A motor vehicle according to claim 3, wherein said slide rails extend obliquely downwards from said side member portions.

* * * * *